(12) United States Patent
Howard

(10) Patent No.: US 7,410,027 B2
(45) Date of Patent: Aug. 12, 2008

(54) DEVICE FOR REDUCING THE IMPACT FOR PEDESTRIANS

(75) Inventor: Mark Howard, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 11/121,844

(22) Filed: May 4, 2005

(65) Prior Publication Data
US 2006/0175115 A1 Aug. 10, 2006

(30) Foreign Application Priority Data
Jun. 18, 2004 (EP) .................................. 04014302

(51) Int. Cl.
B60R 21/34 (2006.01)
(52) U.S. Cl. ....................... 180/274; 180/271; 180/69.2
(58) Field of Classification Search ................. 180/274, 180/271, 69.21
See application file for complete search history.

(56) References Cited

U.S. PATENT DOCUMENTS

| 6,182,782 | B1 * | 2/2001 | Matsuura et al. ............ 180/274 |
| 6,474,302 | B2 | 11/2002 | Takahashi |
| 6,474,679 | B2 * | 11/2002 | Miyasaka et al. ........ 280/730.1 |
| 6,497,302 | B2 | 12/2002 | Ryan |
| 6,588,526 | B1 * | 7/2003 | Polz et al. ................. 180/69.21 |
| 6,644,685 | B2 * | 11/2003 | Sun et al. .................. 280/728.3 |
| 6,668,962 | B2 * | 12/2003 | Son ............................. 180/274 |
| 6,857,495 | B2 * | 2/2005 | Sawa ........................... 180/274 |
| 7,000,720 | B2 * | 2/2006 | Polz et al. ................. 180/69.21 |
| 7,083,023 | B2 * | 8/2006 | Birk et al. .................... 180/274 |
| 7,174,985 | B2 * | 2/2007 | Sawa et al. .................. 180/274 |
| 2003/0042714 | A1 * | 3/2003 | Sawa ........................ 280/730.1 |
| 2003/0075373 | A1 * | 4/2003 | Sawa et al. .................. 180/271 |
| 2003/0121710 | A1 * | 7/2003 | Hamada et al. ............. 180/274 |
| 2004/0074688 | A1 * | 4/2004 | Hashimoto et al. .......... 180/271 |
| 2005/0206139 | A1 * | 9/2005 | Mori et al. ................ 280/730.1 |
| 2005/0279550 | A1 * | 12/2005 | Saville et al. ............ 180/69.21 |
| 2006/0175115 | A1 * | 8/2006 | Howard ....................... 180/274 |
| 2006/0212201 | A1 * | 9/2006 | Takahashi et al. ............. 701/45 |

FOREIGN PATENT DOCUMENTS

JP 2006-062504 * 3/2006

* cited by examiner

Primary Examiner—Kevin Hurley
Assistant Examiner—Karen Amores
(74) Attorney, Agent, or Firm—Frank A. MacKenzie

(57) ABSTRACT

The invention relates to a device for reducing the impact for a pedestrian relative to a vehicle, which vehicle is provided with windshield and a hood covering an engine compartment or a similar compartment in front of the windshield, which hood is provided with at least one hinge adjacent its rear section. The device may comprise at least one actuating mechanism for displacing the rear section of the hood from a rest position to a raised impact position, at least one airbag module being operative to inflate the airbag, causing the airbag to extend out from the rear section of the hood, and an airbag module associated with each actuating mechanism, whereby the reaction force of an operative airbag causes the actuating mechanism to assume the impact position. The invention further relates to a vehicle provided with such a device.

9 Claims, 5 Drawing Sheets

DEVICE FOR REDUCING THE IMPACT FOR PEDESTRIANS

TECHNICAL FIELD

The present invention relates to a device for reducing the impact to pedestrians. The device is configured to avoid direct hood-to-engine contact and to prevent a direct collision with a windshield and/or an A-pillar, thereby protecting the pedestrian.

BACKGROUND ART

Present impact reducing devices may comprise arrangements such as impact reducing hoods for avoiding direct hood-to-engine contact or an inflatable external airbag system of a motor vehicle for protection of people outside of the motor vehicle in the event of a collision between the motor vehicle and a pedestrian, a bicycle, or a motorcycle. As a motor vehicle collides with a pedestrian, a bicycle, or a motorcycle, the pedestrian, a rider of the bicycle, or a rider of the motorcycle, may be hit at his or her lower body with a front body of the motor vehicle so as to land on a hood covering the top of the vehicle front body. Following this primary collision, the pedestrian may suffer a secondary collision with the windshield and/or the pillars on either side of the windshield of the motor vehicle.

U.S. Pat. No. 6,182,782 discloses an impact reducing device, which is mounted to a motor vehicle. The impact reducing device is intended for reducing impact to a pedestrian involved in a collision with a motor vehicle. According to one aspect of the patent, there is provided a device for reducing impact to a pedestrian struck by a motor vehicle having a hood extending in a generally horizontal plane and covering a compartment in front of a windshield of the vehicle. The patent describes a mechanism for the displacement of the hood from a rest position to a impact position raised relative to the rest position, combined with an air bag module including an air bag, said air bag module being operative in cooperation with said displacement mechanism to inflate the air bag, causing the air bag to have a first cushion portion extending beneath the rear of the hood across at most the entire width of the hood and a second cushion portion extending out from the rear of the hood.

A problem with this solution is that it requires separate actuators for each individual component, including two actuators for displacing the hood and one actuator for the airbag. Each such actuator adds to the complexity of the system and the assembly of the vehicle. Every extra component will also take up space in an already densely packed environment. In addition, both the weight and the cost of the vehicle will increase.

Hence there exists a need for a solution that requires fewer components and takes up less space, while performing the same number of functions.

DISCLOSURE OF INVENTION

The above problem is solved by a device for reducing the impact for a pedestrian relative to a vehicle, as claimed in claim 1, and a vehicle provided with a device according to claim 1, as claimed in claim 9.

In the following text any references to direction with respect to the vehicle, such as "front" and "rear", are given relative to the main longitudinal axis of the vehicle, in its normal, forward direction of travel.

According to a first embodiment, the invention relates to a device for reducing the impact for a pedestrian relative to a vehicle, which vehicle comprises windshield and a hood covering an engine compartment, or a similar compartment, in front of the windshield, which hood is provided with at least one hinge. Said hinges may be located at any suitable position, such as adjacent the front or rear section of the hood. The device may further comprise at least one actuating mechanism for displacing the rear section of the hood from a rest position to a raised impact position, at least one airbag module being operative to inflate the airbag, and an airbag module associated with each actuating mechanism, whereby the reaction force of an operative airbag causes the actuating mechanism to assume the raised impact position. The airbag is preferably, but not necessarily, arranged to be inflated fully to extend out from the rear section of the hood to cover at least the A-pillars on either side of the windshield.

During a pedestrian impact a sensor mounted in at a suitable location at the front of the vehicle, such as a bumper mounted sensor or other appropriate sensor, activates the air bag module. The sensor may be any type of suitable sensor device, such as a short range radar, an ultrasonic sensor, or similar. A central processing unit (not shown) determines if and when the airbags are to be deployed based on the signals from one or more of these sensors. When the air bag reaction force reaches a predetermined force limit the airbag module is arranged to be displaced relative to the body of the vehicle from a first position to a second position. During its displacement the airbag module may be arranged to act on an actuating mechanism in the form of a linkage.

According to a first embodiment each actuating mechanism may comprise a linkage having a first and a second lever connecting the airbag module to the vehicle body and hood respectively. The first lever may be attached to a first pivot joint on the airbag module and to a second pivot joint adjacent the rear section of the hood. The second lever may be attached to a first pivot joint on the airbag module and to a third pivot joint on the vehicle body.

According to a second embodiment each actuating mechanism may comprise a first and a second lever connecting the hood to the airbag module and vehicle body respectively. The first lever may be attached to a first pivot joint on the airbag module and to a second pivot joint adjacent the rear section of the hood. The second lever may be attached to a first pivot joint on the hood and to a third pivot joint on the vehicle body.

In both the first and the second embodiment, the first pivot joint is preferably, but not necessarily, located to the rear of the second and third pivot joints. The first and the second levers may preferably, but not necessarily, have substantially the same length. The relative lengths of the respective levers are of course also dependent on the type of linkage used, as well as on the type and size of the vehicle in question.

According to a further embodiment, each hinge may comprise an actuating mechanism. Instead of forming a separate actuating mechanism, said mechanism is integrated with the hinge. Hence, the linkage making up the said mechanism should be arranged to perform the relevant functions of a hinge. In the embodiments listed above, the hood is assumed to be hinged adjacent its rear end preferably, but not necessarily, using two hinges. In this case each hinge may be arranged separate from or integrated with the actuating mechanism or mechanisms. However, each hinge may be arranged adjacent the front end of the hood, separate from the actuating mechanism or mechanisms. The hinges may preferably, but not necessarily, be located spaced apart at either side of the vehicle.

As stated above, an airbag module may be deployed, or made operative, to inflate the airbag, causing the airbag to extend out from the rear section of the hood. According to one embodiment an airbag module may be associated with each actuating mechanism, whereby the reaction force of an operative airbag causes the actuating mechanism to assume a raised impact position. This may be achieved by arranging the airbag module so that it is releasably attached to the vehicle.

According to one embodiment the airbag module may be releasably attached to a fixing means comprising guiding means. The fixing means may comprise a bracket attached to the vehicle body, which bracket may be provided with a guiding means such as a guide slot. The guide slot may be arranged to guide the movement of the airbag module under the influence of the reaction force caused by a gas generator, or similar, in said module. The module may be provided with a guide, such as a guide pin, cooperating with the guide slot. The guide or guide pin may also be used as at least a part of an airbag module attachment means for attaching the said module to the vehicle body. When operated, the airbag module may be arranged to disconnect from a retaining means attaching it to the said fixing means. The retaining means may be in the form of a frangible member, such as a shear pin, that shears or snaps when the airbag is deployed. The frangible member may be a separate component or be a part of either the fixing means and/or the guide attaching the airbag module to the vehicle body.

However, alternative retaining means may be also provided, such as a guiding means or a module attachment means that will hold the airbag module in place until one or both means may yield under the force applied by a deployed airbag. This may be achieved by making at least part of the fixing means or bracket, or the attachment means for attaching the airbag module to the fixing means from a deformable or resilient material. For instance, a fixing means in the form of a bracket may be provided with a guide slot having a first section shaped to hold module attachment means in place and a second section for guiding the movement of a deployed module. According to this example, the attachment means may be in the shape of a guide pin cooperating with the guide slot. The first and second sections may be separated by a restriction in the guide slot, which may be permanently or resiliently deformed to allow the attachment means to pass when the airbag is deployed. According to a further example, a section of the guide pin itself may be arranged to be resiliently deformable, or to shear, when subjected to the initial reaction force caused by the deployed airbag.

Movement of the airbag module under the influence of its reaction force should occur during the initial stage of airbag deployment. The rear section of the hood should be raised to its impact position as quickly as possible, followed by continued deployment of the airbag to cover the A-posts and at least a major part of the windshield. Full deployment of the airbag is preferred, as the reaction force is used to lift the hood quickly and as the airbag must cover at least A-pillars in case a pedestrian or other is carried over the hood.

The reaction force on the airbag module, caused by a gas generator, may be controlled by selecting suitable angles and/or a suitable shape for the vehicle body and the underside of the rear section of the hood adjacent the areas between which the airbag is deployed. A first angle is defined as the angle between the plane of an inner hood panel to the rear of the airbag module and a horizontal plane. A second angle is defined as the angle between the plane of the vehicle body or scuttle area to the rear of the airbag module and a horizontal plane.

According to one embodiment, a portion of the airbag adjacent the rear section of the hood may be arranged to assist the actuation of the actuating mechanism by acting directly on the underside of the rear section of the hood. The air bag deployment may be physically restricted by reducing the first angle and increasing the second angle. This increases both the reaction force and the amount of direct load inner hood panel and the scuttle area in order to lift the hood. However, it may also slow the air bag deployment and stop the air bag from fully deploying over the windscreen and the adjacent side pillars, also termed A-pillars. Alternatively this effect can be achieved and/or modified by changing the shape of a section of the inner hood panel. For instance, by varying the first angle over successive sections of the said hood and panel sections it is possible to control the speed, direction and extent of deployment of the airbag.

Consequently the scuttle area and inner hood panel profiles may be optimised for different types of vehicles. The maximum hinge loading and the gap between the scuttle and hood inner panel may also be factors in choosing the amount of desired restriction.

If the vehicle is provided with a relatively large/long hood, the initial expansion of the airbag may be primarily used to assist the reaction force of the airbag module acting on an actuating mechanism, to raise the rear section of the hood to its impact position. When deployed, a portion of the airbag may arranged to extend out from the rear section of the hood across at least a scuttle area in front of the windshield and partly up the A-pillars. Alternatively, the airbag is arranged to extend out from the rear section of the hood covering the A-pillars and at least the outer two thirds of the windshield. The extension of the airbag may be dependent on factors such as the length of hood, that is, the distance from the front of the vehicle to the rear edge of the hood, the angle of the hood and the length, height and angle of the windshield. Consequently, for larger vehicles with a relatively long hood, where an impact against the windshield is less likely at relatively low speed, the airbag may used for assisting the actuating mechanism and/or for covering at least the scuttle area immediately in front of the windshield. On the other hand, smaller or medium sized vehicles with a relatively short hood, where an impact against the windshield is more likely at relatively low speed, the airbag may used for assisting the actuating mechanism and/or for covering the scuttle area immediately in front of the windshield and at least part of the windshield and/or the A-pillars. According to one embodiment, the airbag is intended to cover at least the two outer thirds of the windshield and wrap around corners of the A-pillars. Consequently, it is possible to adapt the invention to any vehicle and most impact scenarios.

In operation the invention would be used for reducing the impact for a pedestrian relative to a vehicle, which vehicle is provided with windshield and a hood covering an engine compartment or a similar compartment in front of the windshield, which hood is provided with at least one hinge adjacent its rear section. The operation involves the steps of:
  actuating at least one airbag module, causing the airbag to inflate and extend out from the rear section of the hood across at least part of the windshield,
  actuating a actuating mechanism for displacing the rear section of the hood from a rest position to a raised impact position, whereby the reaction force of an operative airbag associated with each actuating mechanism causes the actuating mechanism to assume the impact position.
In particular, the operation involves actuating at least one airbag module located adjacent at least one hinge, and actuating an actuating mechanism integrated in each said hinge.

When actuating at least one airbag module, said module may be allowed to be displaced towards the front of the vehicle for actuating the actuating mechanism.

In all the above embodiments the airbag module should be mounted in such a way that it is waterproof and tamper resistant.

BRIEF DESCRIPTION OF DRAWINGS

In the following text, the invention will be described in detail with reference to the attached drawings. These drawings are used for illustration only and do not in any way limit the scope of the invention. In the drawings.

EMBODIMENTS OF THE INVENTION

Figure 1:
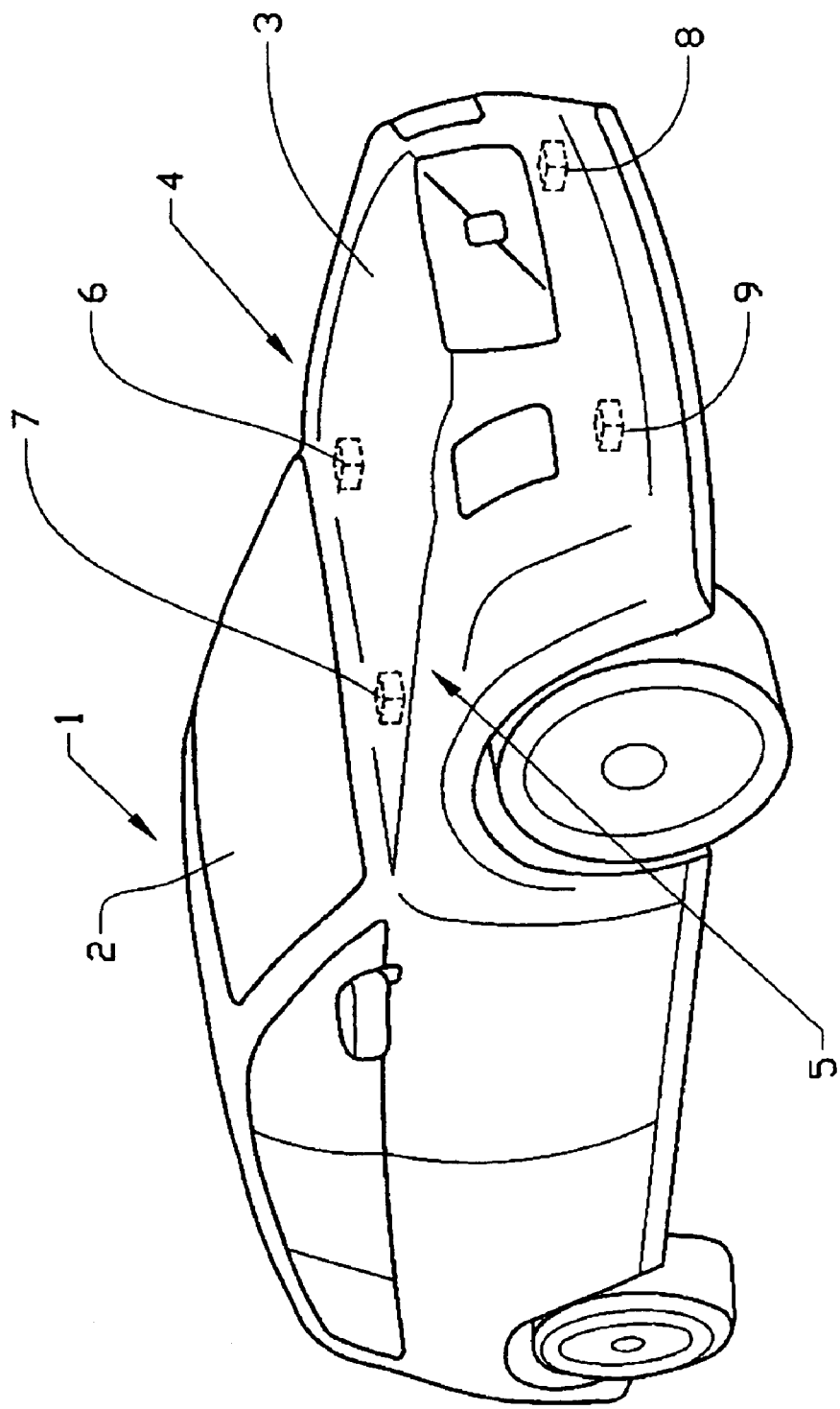
FIG. 1 shows a schematic drawing of a vehicle provided with a device according to the invention.

FIG. 1 shows a vehicle 1 provided with a device for reducing the impact for a pedestrian relative to a vehicle, which vehicle comprises windshield 2 and a hood 3 covering a compartment in front of the windshield, which hood is provided with at least one hinge 4, 5 (indicated, see FIGS. 3 & 5) adjacent its rear section. Adjacent each hinge 4, 5 the vehicle is provided with airbag modules 6, 7, which when deployed will reduce the impact for a pedestrian relative to the vehicle. The deployment is controlled by a pair of short range radar sensors 8, 9 for sensing imminent impact. In this case the sensors are mounted in the front vehicle bumper, although other mountings and/or appropriate types of sensors are possible within the scope of the invention. A central processing unit (not shown) determines if and when the airbags are to be deployed based on the signals from these sensors.

Figure 2:
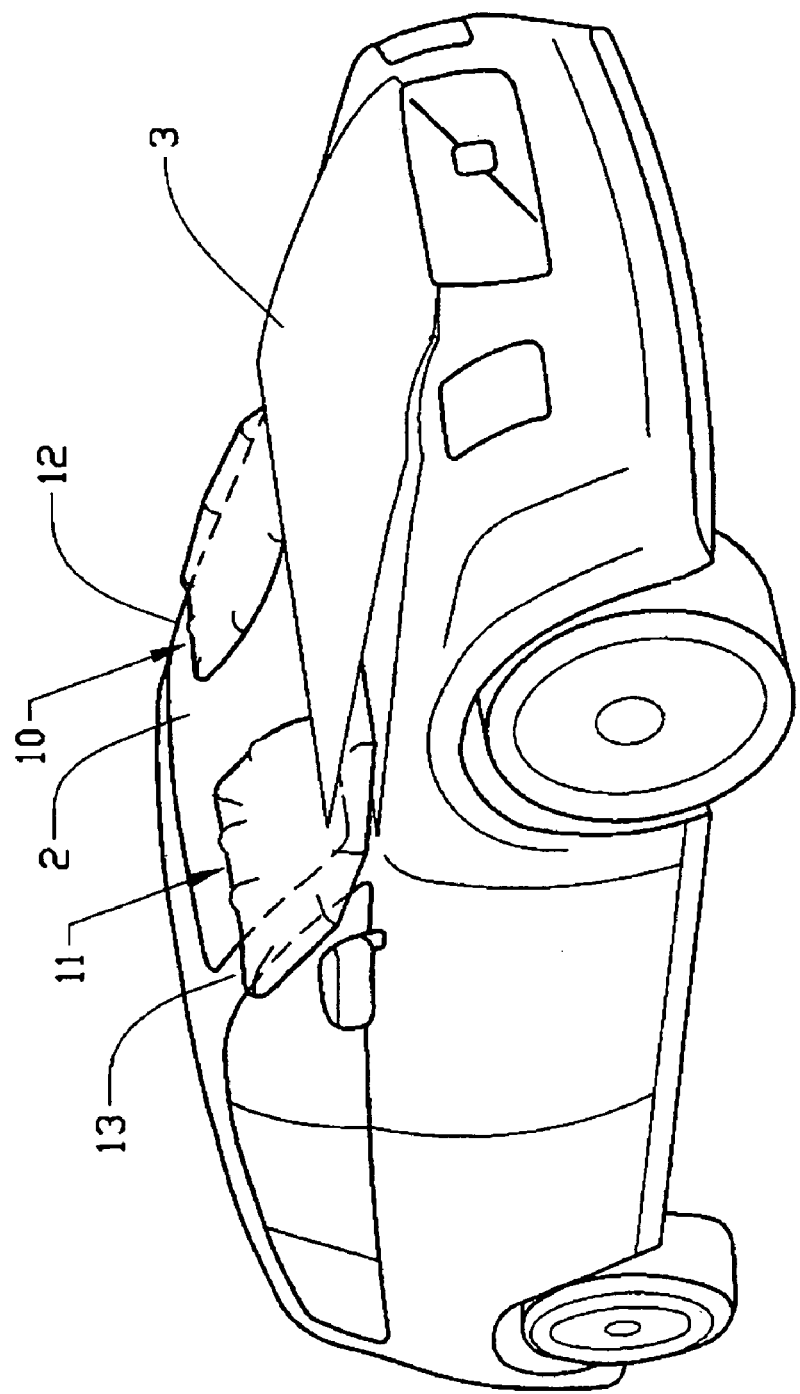
FIG. 2 shows the vehicle in FIG. 1, after actuation.

FIG. 2 shows a vehicle 1 with the impact reducing device in operation. According to this embodiment, both airbag modules 6, 7 have been activated to deploy a first and a second airbag 10, 11 from the rear section of the hood 3, rearwards and upwards to cover approximately two thirds of the total extent of the windshield 2. Both airbags 10, 11 are also arranged to wrap around and cover a pair of A-pillars 12, 13 on either side of the windshield 2. During deployment, the reaction force from the expanding airbags 8, 9 has been used to allow each airbag module 6, 7 to be displaced towards the front of the vehicle. During their displacement, the airbag modules 6, 7 act on their respective hinge 4, 5 to raise the rear section of the hood 3 to an impact position.

Figure 3:
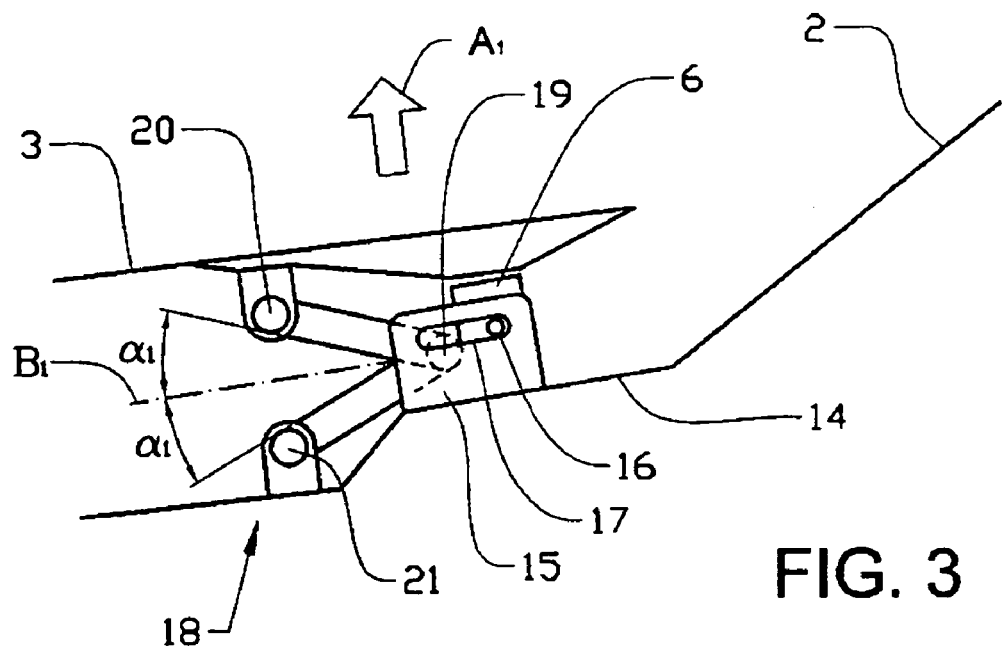
FIG. 3 shows a schematic a cross-sectional side view of a device according to a first embodiment of the invention.

FIG. 3 shows a schematic a cross-sectional side view of a first embodiment of the impact reducing device according to the invention. The figure shows a cross-section through the rear section hood 3 adjacent its side edge. The hood is shown in its normal, closed position. The windshield 2 slopes down towards the front of the vehicle, located to the left in the figure, whereby a scuttle area 14 that extends towards the front of the vehicle, from the lower edge of the windscreen 2 in underneath the hood 3. The basic components of the device include an air bag module 6 that is mounted onto a bracket 15. The airbag module 6 is provided with substantially horizontally extending guide pins 16 on opposite sides of said module, which guide pins 16 located in corresponding slots 17 in the bracket 15. The hood 3 is provided with a hinge system 18 between the rear section of the hood and the scuttle area. The hinge system 18 allows the hood 3 to be opened by releasing and lifting the hood from the front end of the vehicle, while the hood pivots around said hinge system. The hinge system 18 comprises a linkage having three pivoting joints 19, 20, 21 connected by a pair of lever arms 22, 23. The pivoting joints 19, 20, 21 are free to rotate up to a predetermined limit that controls the open and closed hood positions. A low stiffness rotational spring may be required in one or more joints to restrict the degrees of freedom for the normal opening condition of the hood. However, the opening and closing function of the hinge is not part of the current invention and will not be described in further detail.

A first pivoting joint 19 is in contact with the front end of the airbag module 6 and is further connected to a second pivoting joint 20 attached to the underside of the hood by a first lever arm 22. The hood pivots around the first and second joints 19, 20 when opened. The first pivoting joint 19 is in contact with the front end of the airbag module 6 and is further connected to a third pivoting joint 21 attached to the scuttle area by a second lever arm 23. The first and second lever arms 22, 23 are of substantially equal length. The main axes of the guide slots 17 in the bracket 15 are substantially in line with or parallel to a bisector $B_1$ that passes through the first pivoting joint 19 between the first and second lever arms 22, 23. The first and second lever arms 22, 23 extend from said first pivot joint 19 towards the front of the vehicle, at substantially equal angles $\alpha_1$ from the said bisector $B_1$. When actuated by the airbag module 6, the rear section of the hood 3 will be raised to an impact position by means of the said lever arms 22, 23, as indicated by the arrow $A_1$.

Under normal operating conditions the air bag module 6 is held stationary via a releasably fastened connection means (not shown) in at least one of the guide slots 17 in the bracket 15. In this example the connection means is a shear pin.

According to an alternative embodiment, the connection means comprises a restriction in the guide slot, which restriction cooperates with the guide pins to hold the airbag module stationary. After activation of the airbag, the guide pins will deform the restriction, or be deformed by it, to allow the airbag module to be displaced.

Figure 4:
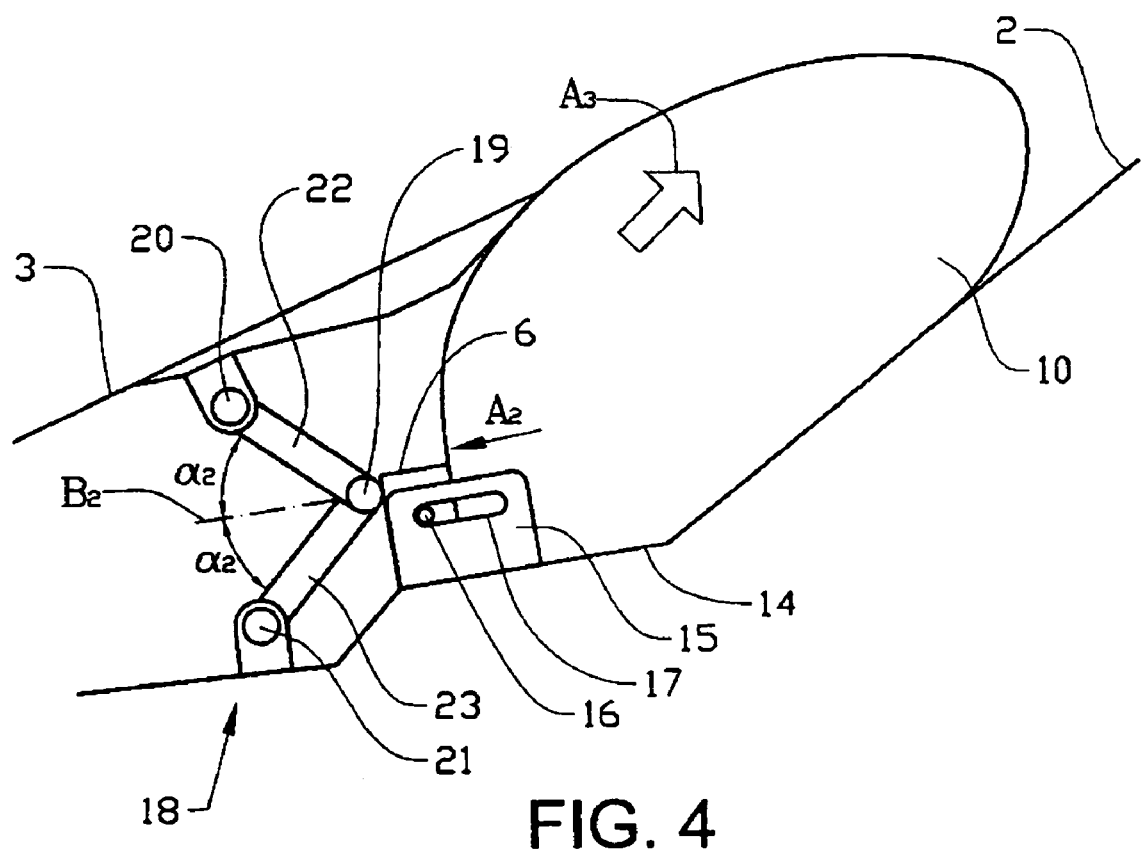
FIG. 4 shows the device in FIG. 3, after actuation.

During a pedestrian impact one or both bumper mounted sensors 8, 9 activates the air bag module 6, as shown in FIG. 4. The airbag reaction force, caused by a gas generator in said module for inflating the airbag, reaches a critical force limit. When this limit is reached, the shear pin shears and the air bag module 6 is pushed along the guide slot 17 in the direction indicated by the arrow $A_2$, towards the front of the vehicle. The critical force limit can be controlled by the maximum shear strength in the shear pin. This movement will also displace the first pivoting joint 19, which is in sliding contact with a surface on the front end of the airbag module 6. The said surface is substantially perpendicular to the bisector $B_1$ (FIG. 3).

The displacement of the first pivot joint 19 occurs simultaneously towards the front of the vehicle and upwards along the front surface of the airbag module, forcing the distal ends of the first and second lever arms 22, 23 apart. When the guide pins 16 reaches the ends of their respective guide slot 17, the hood 3 has been raised to its impact position. In this position, the lever arms 22, 23 are located at substantially equal angles $\alpha_2$ from a second bisector $B_2$, parallel to and above the first bisector $B_1$ (see FIG. 3). At the same time the corresponding airbag 10 is deployed rearwards, to cover the scuttle area 14 in front of the windshield and at least part of the windshield 2, as indicated by the arrow $A_3$. As shown in FIG. 2 it is also arranged to wrap around the A-posts 12, 13.

When the device has been actuated, the air bags 9, 10 provide pedestrian protection in the upper vehicle structure, for the scuttle area, windshield and A-posts. At the same time, pedestrian protection in the front vehicle structure is provided by the lifting of the hood to provide head impact clearance below the hood.

Figure 5:
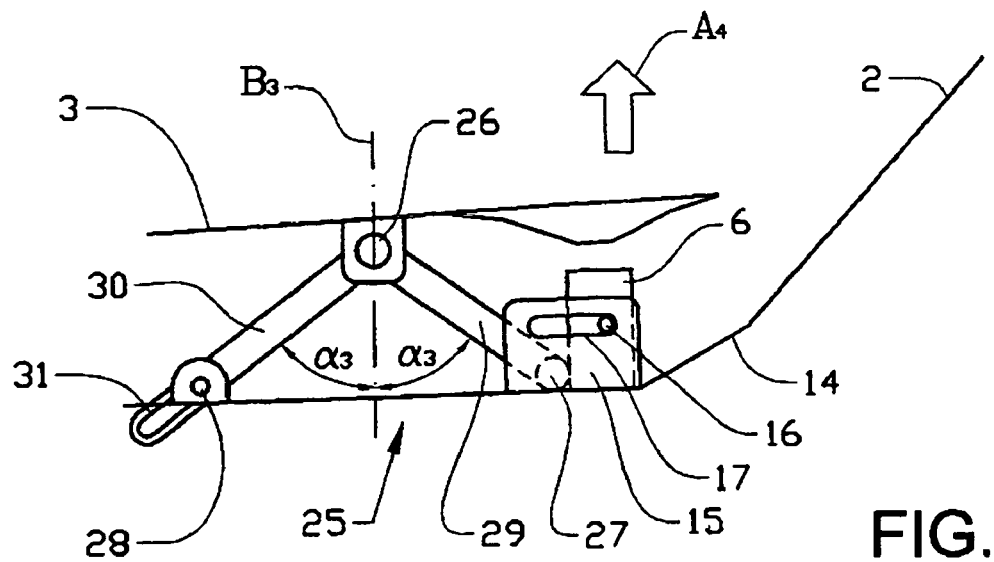
FIG. 5 shows a schematic a cross-sectional side view of a device according to a second embodiment of the invention.

FIG. 5 shows a schematic a cross-sectional side view of a second embodiment of the impact reducing device according to the invention. The figure shows a cross-section through the rear section hood 3 adjacent its side edge. As in the embodiment of FIG. 3, the vehicle is provided with a windshield 2, a hood 3 and a scuttle area 14 extending towards the front of the vehicle, from the lower edge of the windscreen in underneath the hood. Similarly, an airbag module 6 is provided with substantially horizontally extending guide pins 16 on opposite sides of said module, which guide pins 16 located in corresponding slots 17 in a bracket 15. The hood 3 is provided with an alternative hinge system 25 between the rear section of the hood and the scuttle area. The hinge system 25 allows the hood 3 to be opened by releasing and lifting the hood from the front end of the vehicle, while the hood pivots around said hinge system. The hinge system 25 comprises a linkage having three pivoting joints 26, 27, 28 connected by a pair of lever arms 29, 30. The pivoting joints 26, 27, 28 are free to rotate up to a predetermined limit that controls the open and closed hood positions. When opening the hood, the hinge may rotate around an upper pivot joint attached to the hood and a rear pivot joint adjacent the airbag module, while a front lever arm is may slide and pivot relative to a front pivot joint attached to the scuttle area A first pivoting joint 26 is attached to the underside of the rear section of the hood 3 and is connected to the airbag module 6 by a first lever arm 29. The first lever arm 29 is in sliding contact with the front end of the airbag module 6 by means of a second pivoting joint 27. The first pivoting joint 26 is further connected to a third pivoting joint 28 attached to the scuttle area 14 by a second lever arm 30. The first and second lever arms 29, 30 are of substantially equal length. The main axes of the guide slots 17 in the bracket 15 are substantially at right angles to a bisector $B_3$ that passes through the first pivoting joint 26 between the first and second lever arms 29, 30. The first and second lever arms 29, 30 extend from said first pivot joint 26 on the underside of the hood towards the scuttle area, at substantially equal angles $\alpha_3$ from the said bisector $B_3$. When actuated by the airbag module 6, the rear section of the hood 3 will be raised to an impact position by means of the first lever arm 29, as indicated by the arrow $A_4$. The second lever arm 30 will follow the movement of the first lever arm 29. A slot 31 in the front end of the second lever arm 30 allows it to move from a first, rest position to a second, raised position. As opposed to the first embodiment described above, the second lever arm 30 shown in FIG. 5 mainly acts as a support for the hinge system 25. In addition, the second lever arm 30 and the slot 31 enables the hood to be opened. This may not be obvious from the figure, as it is not drawn to scale.

According to a modification of the embodiment shown in FIG. 5, the second lever arm 30 may be fixed to the vehicle at the third pivot joint 28. In this case the first pivot joint 26 is arranged to be slidable relative to the hood 3, in a direction towards the front of the vehicle during actuation of the device. Apart from this difference, the function of the lever arms during deployment of the airbag will substantially the same as described below.

Figure 6:
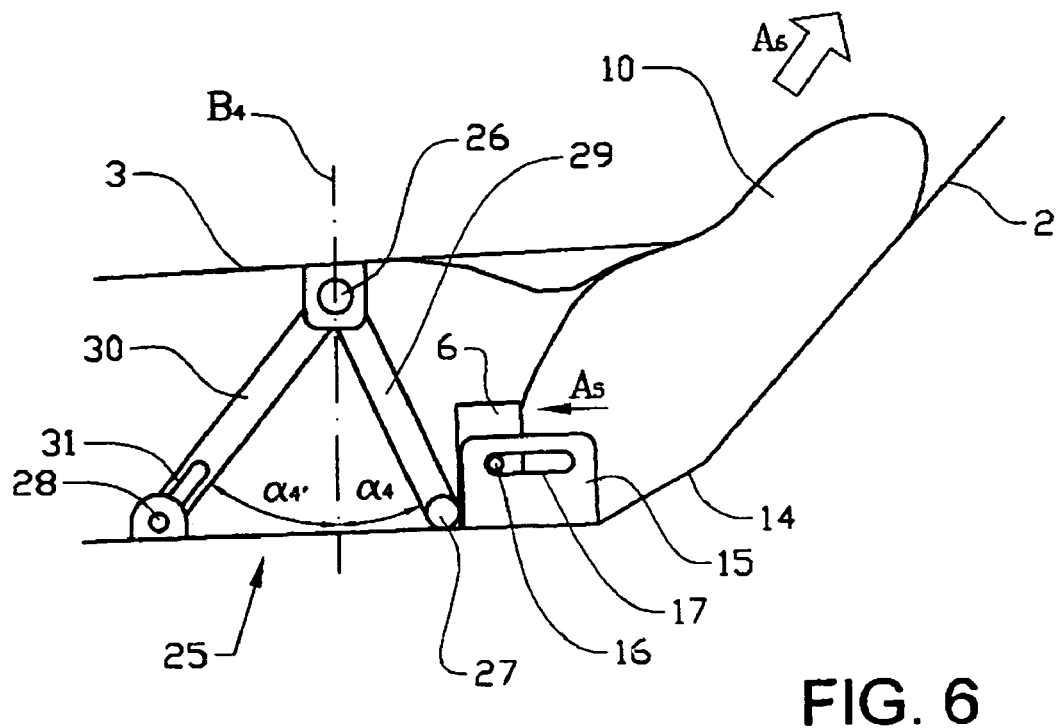
FIG. 6 shows the device in FIG. 3, after actuation.

As described in connection with FIG. 4 above, the reaction force of a deployed airbag will reached a critical force limit. When this limit is reached, a shear pin shears and the air bag module 6 shown in FIG. 6 is pushed along the guide slot 17 in the direction indicated by the arrow $A_5$, towards the front of the vehicle. As in the previous embodiment, the critical force limit can be controlled by the maximum shear strength in the shear pin (not shown). The movement of the airbag module 6 will displace the first and second pivoting joints 26, 27 towards the front of the vehicle. The front surface of the airbag module 6 acting on the second pivot joint 27 is substantially parallel to the bisector $B_3$ (see FIG. 5).

The displacement of the first pivot joint 26 occurs simultaneously towards the front of the vehicle and upwards, away from the scuttle area 14. The second pivot joint 27 is pushed along the scuttle area 14 by the front surface of the airbag module 6, forcing the distal ends of the first and second lever arms 29, 30 together. When the guide pins 16 reaches the ends of their respective guide slot 17, the hood 3 has been raised to its impact position. In this position, the lever arms 29, 30 are located at unequal angles $\alpha_4$, $\alpha'_4$ from a second axis $B_4$, parallel to and in front of the first bisector $B_3$ (see FIG. 5). The unequal angles are a consequence of a movable second pivot joint 27 and a third stationary pivot joint 28. As stated above, the hood is lifted by the airbag module 6 acting on the first lever arm 29. During this displacement, the second lever arm 30 merely acts as a follower. At the same time the corresponding airbag 10 is deployed rearwards, to cover the scuttle area 14 in front of the windshield and at least part of the windshield 2, as indicated by the arrow $A_6$. As shown in FIG. 2 it is also arranged to wrap around the A-posts 12, 13.

According to a third embodiment, the shape of an inner panel profile under the rear section of the hood 3 may be adjusted to achieve an optimum combination of air bag deployment resistance. This is done to increase the air bag module reaction force and to achieve a predetermined degree of hood lift due to the air bag expansion.

Figure 7:
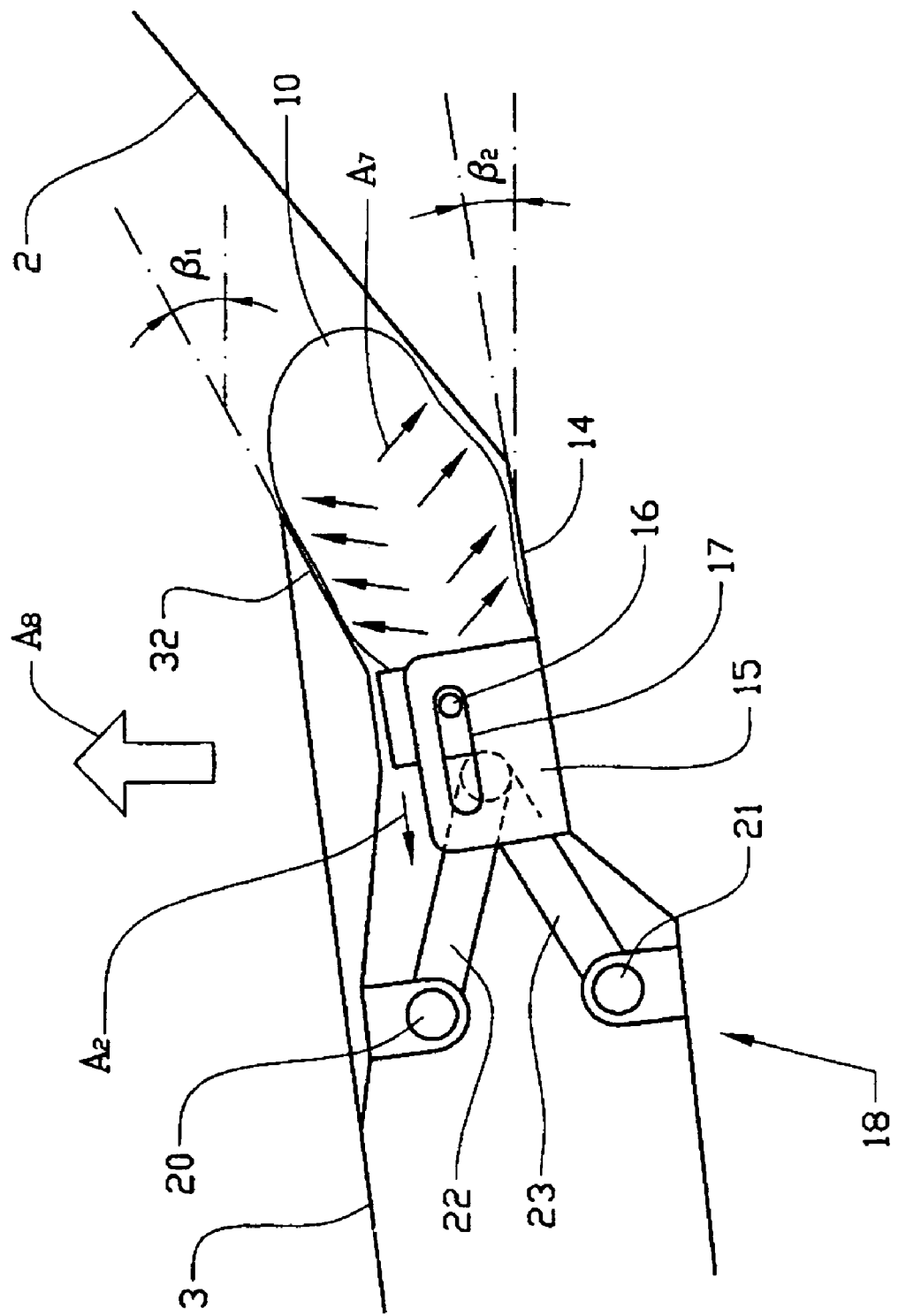
FIG. 7 shows a schematic a cross-sectional side view of a device according to a third embodiment of the invention.

FIG. 7 shows a device as described in connection with FIGS. 3 and 4 above, using the reference numerals of these figures. As schematically indicated in FIG. 7, the rear section of the hood 3 to the rear of the airbag module 6 has an inner panel 32 located in a plane at an angle $\beta_1$ relative to a horizontal plane. Similarly, the scuttle area 14 to the rear of the airbag module 6 is located in a plane at an angle $\beta_2$ relative to a horizontal plane. FIG. 7 shows an airbag 10 in an initial stage of deployment, while the airbag has begun to inflate (see arrows $A_7$) but before the airbag module 6 has been released from its shear pin. In the embodiment shown in FIGS. 3 and 4 the airbag would continue to inflate towards the windshield, while releasing the airbag module to raise the hood in the direction of the arrow $A_8$.

However, the airbag deployment may be restricted by reducing the angle $\beta_1$ and increasing the angle $\beta_2$. This would both increase the airbag reaction force (see arrow A2) and the amount of direct, assisting load in the areas contacted by the airbag, that is, the scuttle area 14 and the inner panel 32. In this way it is possible to raise the hood over a shorter period of time. Similarly it is also possible to slow down the air bag deployment and stop the air bag from fully deploying over the windscreen and A-posts. According to an alternative embodiment, this effect can also be achieved by changing the shape of the said surfaces.

In this way the scuttle area and inner panel profiles of the hood may be optimised for each type of vehicle. The maximum hinge loading and the gap between the scuttle and hood inner panel may also be factors in choosing the amount of desired restriction.

The air bag mounting bracket is only shown with a single guide slot. Depending on the exact geometry it may be necessary to introduce, for example, another degree of freedom to allow larger relative motion to occur between the hinge centre joint and the air bag module. It may also be possible to mount the air bag module in a mounting cup that incorporates the extra degree of freedom.

In the above embodiments, the lengths and/or relative positions of the lever arms and/or guide slots may be chosen with respect to the type of vehicle to which the device is to be adapted. The relative dimensions may depend on factors the size of airbag to be fitted and/or the required clearance between the hood and any underlying components in an engine compartment or similar.

The invention is not limited to the embodiments described above and may be varied freely within the scope of the appended claims.

The invention claimed is:

1. Device for reducing the impact for a pedestrian relative to a vehicle, which vehicle is provided with windshield and a hood covering a compartment in front of the windshield, which hood is provided with at least one hinge, characterized in that at least one actuating mechanism for displacing the rear section of the hood from a rest position to a raised impact position, an airbag module associated with each actuating mechanism and arranged to act on each actuating mechanism in the form of a linkage, each actuating mechanism comprising a first and a second lever connecting the airbag module to the vehicle body and hood respectively, whereby the reaction force of an operative airbag causes the actuating mechanism to assume the impact position.

2. The device as claimed in claim 1, characterized in that each hinge comprises a actuating mechanism.

3. The device as claimed in claim 1, characterized in that the airbag module is releasably attached to a fixing means comprising guiding means.

4. The device as claimed in claim 3, characterized in that, when operated, the least one airbag module is arranged to disconnect from a retaining means attaching it to the fixing means.

5. The device as claimed in claim 4, characterized in that at least one airbag module being operative to inflate the airbag, causing the airbag to extend out from the rear section of the hood.

6. The device as claimed in claim 4, characterized in that a portion of the airbag adjacent the rear section of the hood is arranged to assist the actuation of the actuating mechanism by acting directly on the rear section of the hood.

7. The device as claimed in claim 4, characterized in that a portion of the airbag is arranged to extend out from the rear section of the hood across at least a scuttle area in front the windshield.

8. The device as claimed in claim 4, characterized in that a portion of the airbag is arranged to extend out from the rear section of the hood across at least part of the windshield.

9. Vehicle provided with a device according to claim 1, for reducing the impact for a pedestrian relative to a vehicle.

* * * * *